M. OSNOS.
MOTOR.
APPLICATION FILED DEC. 24, 1913.

1,189,997.    Patented July 4, 1916.

Witnesses:

Inventor:
Mendel Osnos,
by
His Attorney.

UNITED STATES PATENT OFFICE.

MENDEL OSNOS, OF BERLIN, GERMANY, ASSIGNOR TO GENERAL ELECTRIC COMPANY, A CORPORATION OF NEW YORK.

MOTOR.

1,189,997.  Specification of Letters Patent.  Patented July 4, 1916.

Application filed December 24, 1913. Serial No. 808,605.

*To all whom it may concern:*

Be it known that I, MENDEL OSNOS, a subject of the Czar of Russia, residing at Berlin, Germany, have invented certain new and useful Improvements in Motors, of which the following is a specification.

My invention relates to electric motors, and more especially to a construction of compensated series motors for use in electric locomotives operated from rectifier systems.

When it is desired to operate electric locomotives from rectifier systems, certain peculiarities of the current supplied by said systems must be taken into account in the construction of the motors. It will be understood that with rectifier systems the voltage supplied is a pulsating voltage which may be divided into two components, one an alternating current and the other a direct current of constant value. Since the purpose of rectifying an alternating current is to make it like a direct current, it will be seen that it is desirable to smooth out the pulsations of voltage received from the direct current side of the rectifier. Evidently, pulsations of voltage induce pulsating fluxes in the field of the motor supplied therefrom, and such pulsations of flux linking with the coils of the armature which are short circuited by the brushes will produce a transformer action and give poor commutation. By smoothing out such a pulsating voltage it is possible to prevent pulsations in flux in the field of the motor and to thereby secure good commutation.

The object of my invention is to provide such a construction of a compensated series motor that good commutation may be secured during operation with pulsating current. I attain this result as a whole by two arrangements which may be used separately, or combined. I first seek to prevent pulsations of flux in the exciter axis of the motor, and I do this either by using a small air gap in this axis and thereby securing a saturated field, or by setting up a neutralizing flux, by means of a short-circuited winding in inductive relation to the main field winding, which shall be equal and opposite to the pulsating flux. This short circuited winding may be combined with the compensating winding. Next, I may attain the desired result by increasing the self induction in the work axis. Such an increase in self induction may be brought about by using a large air gap in this axis and thereby preventing saturation; or, further, by using an uneven distribution of the compensating winding.

Figure 1:
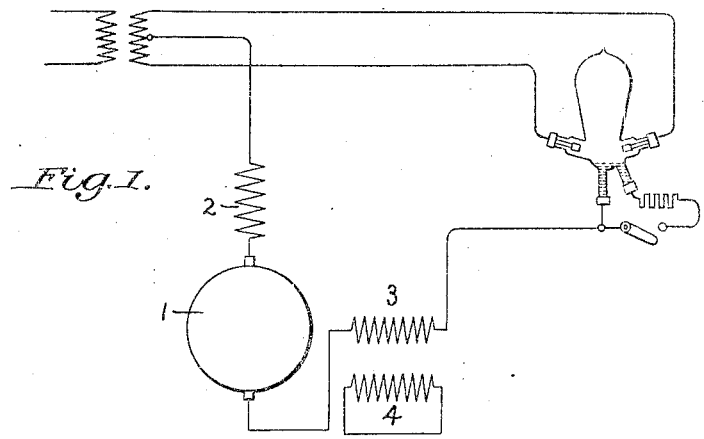
Figure 2:
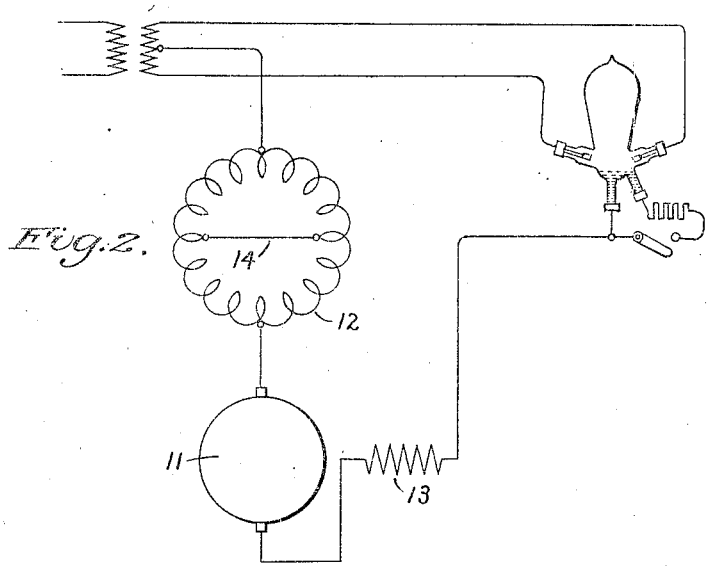
Figure 3:
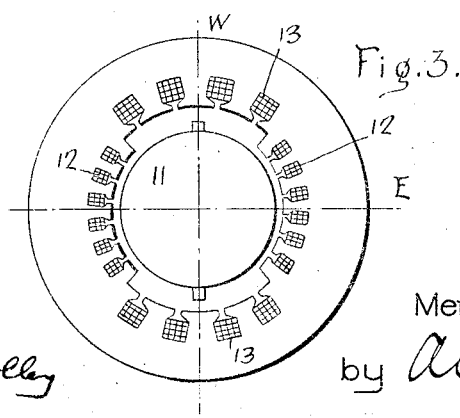

In the accompanying drawing, Figure 1 is a diagrammatic view showing a motor provided with a short circuited winding in inductive relation to the main field winding; Fig. 2 shows such a winding combined with the compensating winding of the motor; Fig. 3 is a diagrammatic view representing a vertical transverse section of a motor embodying my invention.

As previously described, I may prevent pulsations of flux in the exciter axis by making the air gap in this axis of small size and thereby saturating the field. This is shown in Fig. 3, where the air gap in the exciter axis E is small, thereby enabling the exciting winding 13 to readily saturate the field. The result of this is that the magnetization of the field will be along that part of the magnetization curve which is substantially horizontal. Evidently, therefore, the small changes in field current produced by the pulsating voltage will have practically no effect, and pulsations of flux will be avoided. I may also attain the same result by the use of a short-circuited winding either alone or in combination with other features. One form of such a winding is shown diagrammatically in Fig. 1, where the motor 1 is provided with a compensating winding 2, of any desired form, arranged in the work axis of the motor, and a main field winding 3, arranged in the exciter axis thereof. A short-circuited winding 4 is shown in inductive relation to this field winding 3. If the motor 11 is provided, as shown in Fig. 2, with a distributed compensating winding 12, whose terminals lie in the work axis, and an exciting winding 13 in the exciter axis, I may combine my short-circuited winding with the compensating winding by providing a short circuit 14 across the compensating winding at such points that it will lie in the exciter axis of the motor. The pulsating currents in the motor will then induce currents in the short-circuited winding which will set up a pulsating flux which will be equal and opposite to the pulsating flux caused by the current in the main field. By thus neutralizing pulsations of flux, transformer action and sparking will be prevented. When the short-circuited winding and the compensating winding are combined as shown in Fig. 2 of the drawing, the pulsations of the current induced therein, by reason of the short circuit 14, will set up a neutralizing flux acting in the same manner as previously described.

In order to increase the self induction in the work axis W, and thereby increase the self induction of the compensating and armature windings, I make the air gap in this axis of large size, as shown in Fig. 3, thereby preventing saturation with its consequent effects. By making the self induction in the work axis of the motor large, I produce a choking effect which is comparable to that produced by a choke coil in series with the motor. Combined with this arrangement, or separately, I may so arrange the compensating winding of the motor that it will be unevenly distributed around the periphery and be disposed in a few slots. With this manner of arranging the compensating winding, exact compensation for the armature reaction will not be obtained, but I shall secure other desirable results.

By properly arranging my winding in a few slots, as for example in the manner illustrated in Fig. 3, where we have one possible arrangement of a compensating winding 12, I allow the passage of a certain flux along the work axis W, and thereby secure a larger self induction in the compensating and armature windings. Were an even distribution of compensating winding used, it is evident that the tendency would be to entirely prevent any such flux along the work axis and to therefore keep down the self induction of the compensating and armature windings.

As is customary in this type of motor, I employ a laminated field structure, held together in any desired manner.

I wish it understood that all the arrangements which I have described above can be used either separately or in combination, since each acts independently toward the same end.

I have, therefore, provided such a construction of compensated series motor that I may operate the same from a rectifier system and still secure good commutation.

While I have shown and described herein the best embodiment of my invention now known to me, I conceive that various modifications of this exact arrangement might be made, and I therefore do not wish to be limited to what I have shown, but seek to cover in the appended claims all such modifications as come with the scope and spirit of my invention.

What I claim as new and desire to secure by Letters Patent of the United States, is:—

1. In combination, a source of pulsating current and a compensated series motor, said motor having means for preventing pulsations of flux in its exciting axis corresponding to the pulsations of current, comprising a saturated field core in said axis.

2. In combination, a source of pulsating current and a compensated series motor, said motor having an exciting winding, a compensating winding, and means for preventing pulsations of flux in its exciting axis corresponding to the pulsations of current, comprising a short-circuit for said compensating winding arranged in the exciting axis.

3. In combination, a source of pulsating current and a compensated series motor, said motor having an armature winding, a compensating winding, means for increasing the self-induction of the compensating and armature windings, and means for preventing pulsations of flux in the exciting axis corresponding to the pulsations of current, comprising a saturated field core in said axis.

4. In combination, a source of pulsating current and a compensated series motor, said motor having an armature winding, an exciting winding, a compensating winding, means for increasing the self-induction of the compensating and the armature windings, and means for preventing pulsations of flux in the exciting axis corresponding to the pulsations of current, comprising means providing a closed electrical circuit in inductive relation to the exciting winding.

5. In combination, a source of pulsating current and a compensated series motor, said motor having an armature winding, an exciting winding, a compensating winding, means for increasing the self-induction of the compensating and armature windings, and means for preventing pulsations of flux in the exciting axis corresponding to the pulsations of current, comprising a short circuit for said compensating winding arranged in the exciting axis.

6. In combination, a source of pulsating current and a compensated series motor, said motor having an armature winding, an exciting winding, a compensating winding, means for increasing the self-induction of the compensating and armature windings, and means for preventing pulsations of flux in the exciting axis corresponding to the pulsations of current, comprising a saturated field core in said axis and means providing a closed electrical circuit in inductive relation to the exciting winding.

In witness whereof, I have hereunto set my hand this 11th day of December, 1913.

MENDEL OSNOS.

Witnesses:
RICHARD NEUMANN,
CHRISTIAN KRÄMER.